United States Patent
Maslinkovskiy (10) Patent No.: US 11,397,071 B1
(45) Date of Patent: Jul. 26, 2022

(54) SYSTEM AND METHOD FOR ANTI-BLINDING TARGET GAME

(71) Applicant: Vladimir V. Maslinkovskiy, Parkland, FL (US)

(72) Inventor: Vladimir V. Maslinkovskiy, Parkland, FL (US)

( * ) Notice: Subject to any disclaimer, the term of this patent is extended or adjusted under 35 U.S.C. 154(b) by 0 days.

(21) Appl. No.: 17/474,551

(22) Filed: Sep. 14, 2021

(51) Int. Cl.
*F41J 5/02* (2006.01)
*G01S 17/04* (2020.01)
*G01S 17/08* (2006.01)
*G01S 17/88* (2006.01)

(52) U.S. Cl.
CPC .............. *F41J 5/02* (2013.01); *G01S 17/04* (2020.01); *G01S 17/08* (2013.01); *G01S 17/88* (2013.01)

(58) Field of Classification Search
CPC .. F41J 5/02; G01S 17/04; G01S 17/08; G01S 17/88; G01S 7/497
See application file for complete search history.

(56) References Cited

U.S. PATENT DOCUMENTS

| | | | |
|---|---|---|---|
| 5,551,876 A | 9/1996 | Koresawa et al. | |
| 6,361,173 B1 | 3/2002 | Vlahos et al. | |
| 6,875,019 B2 | 4/2005 | Huang et al. | |
| 7,063,620 B2 | 6/2006 | Nearhood | |
| 7,544,137 B2 | 6/2009 | Richardson | |
| 8,292,733 B2 | 10/2012 | Crawford et al. | |
| 8,459,997 B2 | 6/2013 | Carter | |
| 8,721,460 B2 | 5/2014 | Rosenblum | |
| 9,079,099 B1 | 7/2015 | Murphy et al. | |
| 9,283,432 B2 | 3/2016 | Marty et al. | |
| 10,066,908 B2 | 9/2018 | Hong | |
| 10,099,144 B2 | 10/2018 | Dawe et al. | |
| 10,317,177 B2 | 6/2019 | Dale et al. | |
| 10,360,685 B2 | 7/2019 | Marty et al. | |
| 10,473,439 B2 | 11/2019 | Bortz et al. | |
| 10,552,967 B2 | 2/2020 | DeAngelis et al. | |
| 10,675,536 B2 | 6/2020 | Chen | |
| 10,677,571 B2 | 6/2020 | Oh et al. | |
| 10,712,133 B2 | 7/2020 | Kerley et al. | |
| 10,724,832 B2 | 7/2020 | Washington | |
| 10,850,186 B2 | 12/2020 | Chung | |
| 2003/0107177 A1* | 6/2003 | Jancik | F41J 3/00 273/348 |
| 2006/0160639 A1 | 7/2006 | Klein | |
| 2008/0312010 A1 | 12/2008 | Marty et al. | |

(Continued)

FOREIGN PATENT DOCUMENTS

CN 211069025 7/2020

*Primary Examiner* — Yuqing Xiao
*Assistant Examiner* — Benjamin Richard Hebert
(74) *Attorney, Agent, or Firm* — The Concept Law Group, PA; Scott D. Smiley; Scott M. Garrett (57) ABSTRACT

A system, method, and console for interactive gaming including an anti-blinding target game is disclosed. The system includes a console, a LIDAR system, and a server all of which are communicatively coupled via a network. The console is configured to project gameplay visuals while continuously using the LIDAR system to monitor the gameplay environment. Upon the LIDAR system detecting a significant modification to the gameplay environment, the console initiates an anti-blinding mode resulting in black light being emitted from the console in order to prevent impacting the eye health of users.

18 Claims, 6 Drawing Sheets

(56) References Cited

U.S. PATENT DOCUMENTS

| | | |
|---|---|---|
| 2010/0127079 A1 | 6/2010 | Fang et al. |
| 2010/0240015 A1 | 9/2010 | Chung et al. |
| 2011/0053120 A1 | 3/2011 | Galanis et al. |
| 2012/0183931 A1 | 7/2012 | Galanis et al. |
| 2013/0278716 A1* | 10/2013 | Kennedy ............ G06K 9/00288 |
| | | 348/42 |
| 2014/0151965 A1 | 6/2014 | Garas |
| 2014/0199913 A1 | 6/2014 | Rosenblum |
| 2016/0006914 A1* | 1/2016 | Neumann ............. G01S 7/4817 |
| | | 348/78 |
| 2016/0041266 A1* | 2/2016 | Smits ....................... G01S 17/66 |
| | | 356/5.01 |
| 2016/0266648 A1 | 9/2016 | Shingu et al. |
| 2017/0167832 A1 | 6/2017 | Hong |
| 2017/0326444 A1* | 11/2017 | Hong .................... A63F 9/0204 |
| 2017/0340948 A1* | 11/2017 | Leech ................ A63B 69/3658 |
| 2017/0370682 A1 | 12/2017 | Hong |
| 2018/0318715 A1 | 11/2018 | Dawe et al. |
| 2019/0134487 A1* | 5/2019 | Kudirka .................. G06F 3/011 |
| 2020/0038743 A1 | 2/2020 | Chung |
| 2022/0074716 A1* | 3/2022 | Chia ......................... G06T 7/73 |

\* cited by examiner

SYSTEM AND METHOD FOR ANTI-BLINDING TARGET GAME

FIELD OF THE DISCLOSURE

The present invention relates generally to novelty games, and more specifically interactive gaming systems utilizing lidar (light detection and ranging).

BACKGROUND OF THE DISCLOSURE

Target games are games where physical objects are thrown at a target. One such game that has been popular for many years is darts. This game is commonly found in bars and restaurants throughout the world. Recently, a modified version of the traditional darts game has appeared and has become amazingly popular. With the new game, instead of darts, users hurl axes at a wooden target a distance away from the user, Historically, target games offer a limited number of options due to restricting factors such as gameplay space, safety, and other applicable factors. In particular, players who wish to retrieve objects thrown at the target game have previously had to themselves (or have a third party) manually walk to the target, putting their safety at risk, for example, if an object is launched at a target while the user is in the way.

In recent years, interactive games have emerged allowing games, such as target games, to be implemented by two-dimensional digital light processing (DLP) technology. While this implementation has assisted with volatile target projection increasing game difficulty, and introduced wireless communication devices, virtualization, and other beneficial technologies into the gaming industry, there are still a significant number of drawbacks to this implementation. For example, latency projection is a significant drawback in which the projection on the applicable surface lags due to projector malfunctions, connectivity issues, and other issues that directly impact gamers and can be a significant factor in whether a gamer wins or loses a game.

In addition, particularly in target games that use projectors, there are a significant number of issues pertaining to critical factors for gaming, such as phantom touches in which unregistered/unapproved interactions are detected, recorded, and impact a gamer's score, inaccurate hit rates due to the gaming system not properly allocating the gamer's hits at or near the target, display freezing, and calibration issues. Moreover, the light that is emitted from the projector in order to display the gaming environment poses a threat to gamers because it presents a high risk of blinding a gamer who steps within the vicinity of the projecting light. In gaming systems that require manual application of an object to a target, the risk of blinding from the projection light is high due to the fact that the gamer has to walk within the projection to remove the launched object. This creates dangers in that the gamer can trip over objects they can no longer see and/or they can be rendered unable to dodge objects thrown their way because they cannot see.

Due to the increasing demand for three-dimensional imaging, LIDAR systems have been implemented to process and interpret data over a given area by utilizing photodetectors and other applicable light sources. However, integrating LIDAR systems to interactive gaming systems does not circumvent the issues associated with latency of projections emitted from the projector or the high risks to eye-safety.

Therefore, there exists a need for a system and method for interactive gaming that does not fall victim to the aforementioned issues associated with the current existing systems.

SUMMARY OF THE DISCLOSURE

The invention provides systems and methods for interactive gaming including an anti-blinding mechanism that overcomes the hereinafter-mentioned disadvantages of the heretofore-known devices and methods of this general type and that effectively facilitates an interactive gaming system that provides increased accuracy, reduced latency, and prevention of blinding of gamers.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for preventing blinding effect including generating, via a light source, light across a game-play area and onto a target; identifying, via a LIDAR device, the target; monitoring, via the LIDAR device, the at least a portion of the game-play area; identifying a person entering the at least a portion of the game-play area being monitored; and emitting, via the light source, black light.

Embodiments of the present invention also provides a system for interactive gaming including: at least one light generator operable to generate light pulses across a game-play area and onto a target; and a LIDAR device operable to: identify the target; monitor at least a portion of the game-play area; identify a person present in the at least a portion of the game-play area; and cause the at least one light source to project black light within the game-play area.

In some embodiments, at least a portion of the play area is an area immediately proximate to the target.

In some embodiments, wherein black light is emitted only on the person or the black light may be emitted in a silhouette frame with dimensions proportional to the person, and the light generated across the game-play area includes a target feature. The target is a physical target configured to receive a physical object projected at the target.

In some embodiments, the method further includes determining, via the LIDAR device, a distance between the target and a landing location of the physical object; and generating, via a processor communicatively coupled to the LIDAR device, a score based on the distance.

In some embodiments, generating the plurality of light pulses includes continuously projecting, via the console, a visible media when the console does not detect the source.

In some embodiments, emitting the plurality of black light further comprises generating a silhouette frame including dimensions proportional to the source and emitting the plurality of black light into the silhouette frame.

In some embodiments, the LIDAR target is a target position of a physical target configured to receive a physical object.

In some embodiments, the method further includes determining, via the LIDAR device, a distance between the target and a landing location of the physical object; and generating, via a processor communicatively coupled to the LIDAR device, a score based on the distance.

In some embodiments, the method further includes establishing, via the LIDAR device, a rate of response based on a length of time the LIDAR device requires to detect the target; reducing, via a latency reduction module, latency associated with generating the light across the game-play area. The latency reduction module reduces latency based on the rate of response.

In some embodiments, the game-play area extends from a first end including the at least one light generator to a second end including the target and the first and second ends cooperate to define a gaming lane including a distance of at least 13 feet.

In some embodiments, the LIDAR device is further operable to determine a distance between the target and a landing location of the physical object and generate a score based on the proximity distance.

Although the invention is illustrated and described herein as embodied in a system and methods for interactive gaming, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides novel and efficient systems and methods for interactive gaming, more particularly, interactive gaming utilizing both physical and optical devices and structures. Embodiments of the invention provide a method for preventing blinding effects are configured to use a novel console including a sensor and a LIDAR system in order to visualize a surface area and adjust the projection from the console to the surface area based upon modifications to data acquired by the sensor and the LIDAR system. Embodiments of the invention further provide novel modules configured to reduce latency of projections emitted from the console and increase efficiency and accuracy of communications between the console and objects interacting with the console. Embodiments of the invention further provide a machine learning module configured to utilize 3D point cloud data acquired from the LIDAR system in order to increase the efficiency of identification of objects within the 3D cloud point frame, tracking objects of interest over a sequence of 3D point cloud frames, and segmenting points of a 3D cloud frame into predefined categories based on applying machine learning algorithms to data acquired by the sensor and the LIDAR system. The systems and methods described herein provide improvements to interactive gaming systems by increasing efficiency of depiction of the gaming environment, enhancing accuracy of scoring within the gaming environment due to significant reduction of latency and phantom touches, and eliminating risks to eye safety due to the projection from optical devices.

Figure 1:
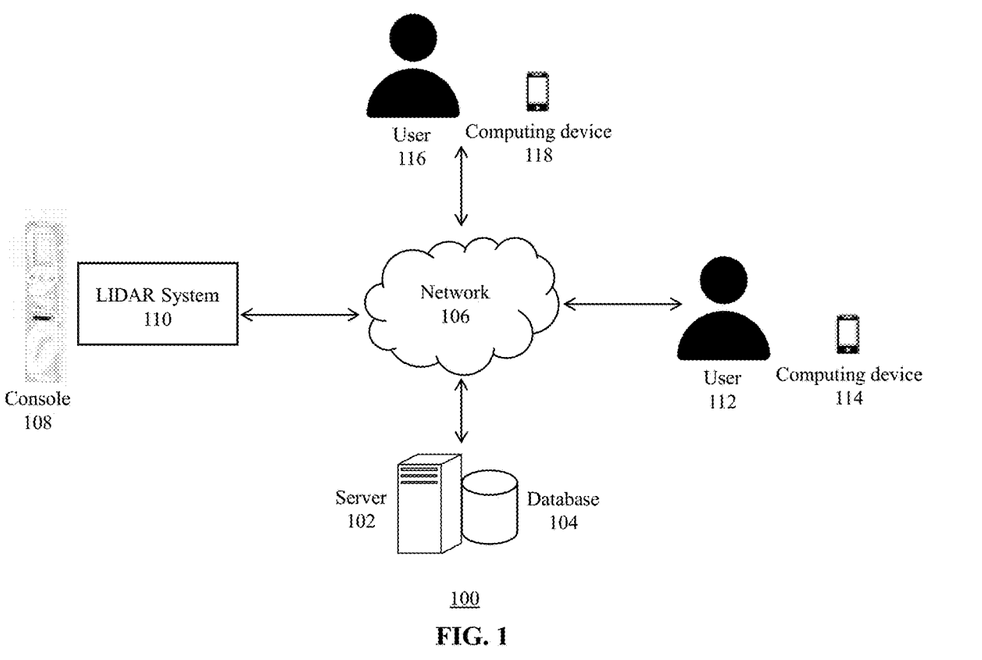
FIG. 1 is a block diagram depicting an exemplary interactive gaming system and users, according to an example embodiment.

Referring to FIG. 1, an interactive gaming system 100 is depicted, according to an exemplary embodiment. In some embodiments, system 100 includes a server 102 communicatively coupled to a database 104. The system further includes a network 106 that communicatively couples the server 102 and database 104 to a console 108 and a LIDAR system 110. Also coupled to the network 106 are a first computing device 114 associated with first user 112 and a second computing device 118 associated with a second user 116. It is to be understood that server 102, database 104, console 108, LIDAR system 110, and computing devices 114 and 118 (if applicable) may be communicatively coupled to each other over network 106. One or more servers may be operated and/or maintained by the same or different entities. Server 102 and any server mentioned throughout the instant description may be implemented in hardware, software, or a combination of hardware and software. Network 106 may be implemented as a Local Area Network (LAN), Wide Area Network (WAN), mobile communication network (GSM, GPRS, CDMA, MOBITEX, EDGE), Ethernet or the Internet, peer-to-peer network, one or more terrestrial, satellite or wireless links, or any medium or mechanism that provides for the exchange of data between the aforementioned components of system 100. In some embodiments, console 108 is a gaming terminal in which a distinct console may be associated with each user of system 100 allowing network 106 to be a gaming network including multiple gaming terminals. However, one or more sessions may be hosted via console 108 in which console 108 is communicatively coupled to computing devices 114 and 118. As described herein, computing devices 114 and 118 and any other applicable computing device of system 100 includes but is not limited to a mobile phone, tablet, smart phone, desktop, laptop, wearable technology, or any other applicable device or system including at least a processor. Although computing devices 114 and 118 are not required in order for users 112 and 116 to utilize console 108, users 112 and 116 may participate in one or more gaming sessions operated by console 108 and users 112 and 116 may receive real-time updates at computing devices 114 and 118 pertaining to scoring, hit rate, bullseye proximity, or any other applicable gaming factor known to those of ordinary skill in the art.

In some embodiments, scores and other applicable information (gamertag, ranking, etc.) associated with users of system 100 may be stored in a plurality of gamer profile records housed on database 104 allowing server 102 to transmit rankings, accomplishments, rewards, highest scorers, and other applicable gamer information to console 108 and/or computing devices 114 and 118. It is to be understood that system 100 is configured to support any applicable game/match/session/competition configured to be depicted via an optical device including but not limited to tile-matching, shooting games, or any other applicable game configured to be depicted on an optical device. In a preferred embodiment, system 100 is configured to host an axe-throwing game in which the score of each user is calculated based on ability to hit at or near a target image projected by console 108.

Figure 2:
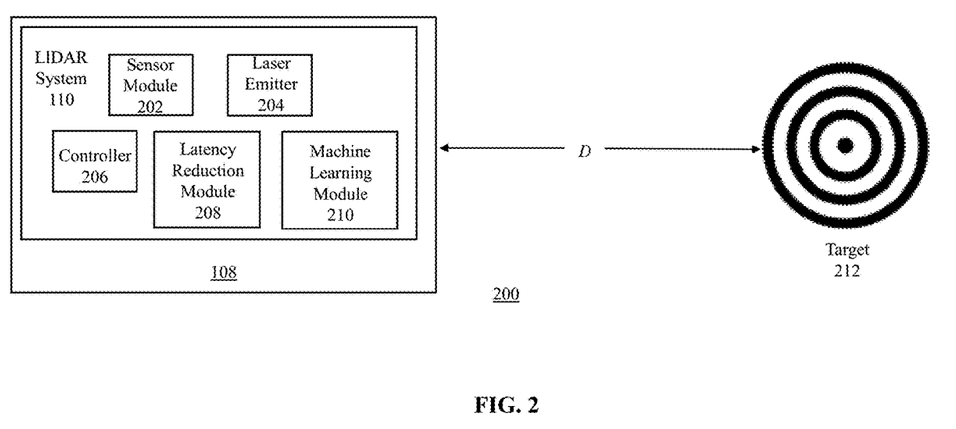
FIG. 2 is a block diagram depicting an exemplary LIDAR system and portions of the interactive gaming system of FIG. 1, according to an example embodiment.

Referring now to FIG. 2, a block diagram of a gaming environment 200 including LIDAR system 110 is depicted, according to an exemplary embodiment. In some embodiments, LIDAR system 110 includes a sensor module 202, a laser emitter 204, a controller 206, a latency reduction module 208, and a machine learning module 210. In some embodiments, gaming environment 200 further includes an emitted target 212 projected from console 108. The emitted target 212 is at a distance D from the console 108, which houses the LIDAR system 110. The sensor module 202 may include a camera (RGB, infra-ray, etc.), IMU, topographic, bathymetric, or any other applicable type of sensor or combination thereof necessary to perform environment analysis and LIDAR functions known to those of ordinary skill in the art. In some embodiments, the distance D is 13 feet. The invention is not restricted, however, to any specific dimension of distance D and it is to be understood that the distance D is subject to the configuration of gaming environment 200 in which various lengths and orientation are within the spirit of the disclosure. It is to be understood that distance D is a gaming lane in which emitted target 212 is projected from a proximal end of the distance D to a physical target of a LIDAR based target position at or proximate to a distal end of the distance D.

It is to be understood that LIDAR system 110 may be configured to be integrated with and/or associated with console 108 in which LIDAR system 110 is configured to be attached to or proximate to console 108. The purpose behind LIDAR system 110 being proximate to console 108 is to ensure that the media being projected from console 108 is being accurately and proportionally emitted upon a surface located at distance D, which is based upon analysis and calculation of the distance D by sensor module 202 and laser emitter 204. In some embodiments, sensor module 202 includes a sensor communicatively coupled to laser emitter 204 and in some embodiments, sensor module 202 and laser emitter 204 may be a single component including the sensor and a light source allowing sensor module 202 to collect data within the environment in which console 108 is located and emit a plurality of light pulses into the environment. Laser emitter 204 is a light module including the light source designed and configured to generate the plurality of light pulses into the environment. In some embodiments, data collected by the sensor determines factors associated with laser emitter 204 including but not limited to laser power, pulse length, pulse shapes, pulse width, pulse frequency, wavelength, or any other applicable factor pertaining to laser pulsing known to those of ordinary skill in the art. Laser emitter 204 generating the plurality of light pulses allows sensor module 202 and/or laser emitter 204 to not only illuminate an object or space with an optical pulse for measuring characteristics of a reflected return signal, but also detect gaming environments along with objects in its field of view and maps their distances. In some embodiments, each light pulse of the plurality of light pulses is associated with a measurement time window, each light pulse of the plurality of light pulses (along with its reflection) is configured to be processed into a point cloud. As described herein, a point cloud is one or more datasets that represent objects or space in which the points represent a 3D shape or object.

In some embodiments, controller 206 is a module configured to control emitting the plurality of light pulses from laser emitter 204 along with reflection of scattered light pulses of objects onto the sensor. In some embodiments, LIDAR system 110 may include mirrors, light processing components, scanners, or any other applicable LIDAR mechanisms known to those of ordinary skill in the art. It is to be understood that one of the primary purposes of LIDAR system 110 is to utilize the plurality of light pulses to collect measurements of surface area in order to create maps, 3D models, and other applicable visualizations of gaming environment 200 (including gaming environment 200). In some embodiments, LIDAR system 110 may be a plurality of LIDAR sensors in which at least a first LIDAR sensor is coupled to console 108, either wired or communicatively, to facilitate detection of conditions warranting the activation of anti-blinding mode, and at least a second LIDAR sensor configured to facilitate components of gameplay such scoring, target accuracy, etc.

In some embodiments, console 108 and/or LIDAR system 110 are configured to determine emitted target 212. Emitted target 212 may be utilized by console 108 and/or LIDAR system 110 to establish length in which length D is the distance between the console 108 and surface upon which emitted target 212 is displayed. Target 212 can also be a physical target. Based upon the generation of the plurality of light pulses and their associated reflections, console 108 and/or LIDAR system 110 can establish distance D based on a rate of response from data collected by the sensor. In some embodiments, latency reduction module 208 is configured to allow instant processing of raw LIDAR data acquired by sensor module 202 via utilizing LIDAR data packets in order to improve the speed of 3D point cloud clustering which results in reduction of latency. The instant processing of a buffer of received data packets ensures the enhancement of the latency. In some embodiments, latency reduction module 208 reduces latency based on data associated with the rate of response (reflection of the light pulses) established between sensor module 202 and D of gaming environment 200.

In some embodiments, machine learning module 210 is a module configured to use the 3D point cloud data in order to generate a 3D snapshot of gaming environment 200 based off of data collected by sensor module 202. Machine learning module 210 may include a server communicatively coupled to server 102 configured to generate a classification model generated based on training data utilizing one or more machine learning techniques, in which feature values and/or training data (instances of the training data) are configured to be inserted into the classification model. It is to be understood that machine learning as provided is the study and construction of algorithms that can learn from, and make predictions on, data. Such algorithms operate by building a model from inputs in order to make data-driven predictions or decisions. The machine-learned model is trained based on multiple attributes (or factors) described herein. In machine learning parlance, such attributes are referred to as "features". In an embodiment, various feature weights or coefficients are established in order to accurately generate predictions for system 100. In some embodiments, the training data may be derived from data collected from server 102, sensor module 202, the 3D point cloud data directly, or any other applicable source. In some embodiments, machine learning module 210 is configured to augment each point in the LIDAR point cloud with data about neighboring points in order to improve performance of downstream learning algorithms. In addition, the training data is configured to be dynamically acquired over long periods of time. For example, a new machine-learned model is generated regularly, such as every hour, day, month, week, or other time period. Thus, the new machine-learned model may replace a previous machine-learned model. Newly acquired or changed training data may be used to update the model.

In some embodiments, the 3D point cloud data assists machine learning module 210 (ultimately server 102 and LIDAR system 110) in identification of objects within the 3D point cloud frame, tracking objects of interest over a sequence of 3D point cloud frames, and segmenting points of a 3D point cloud frame into predefined categories.

Figure 3:
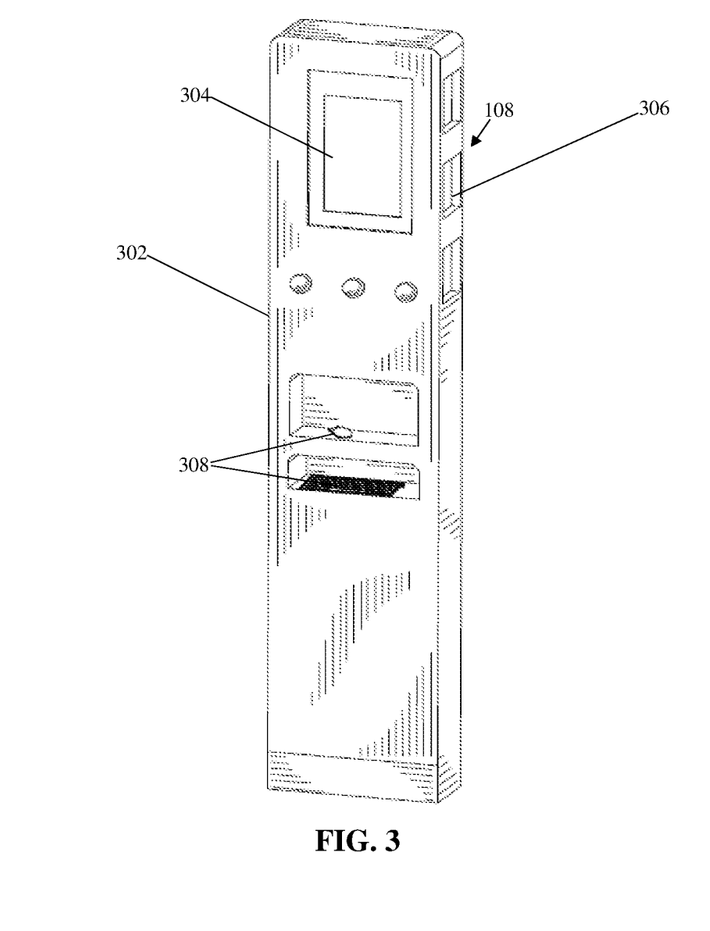
FIG. 3 is a front view of a console of the interactive gaming system of FIG. 1 in a closed configuration, according to an example embodiment.
Figure 4:
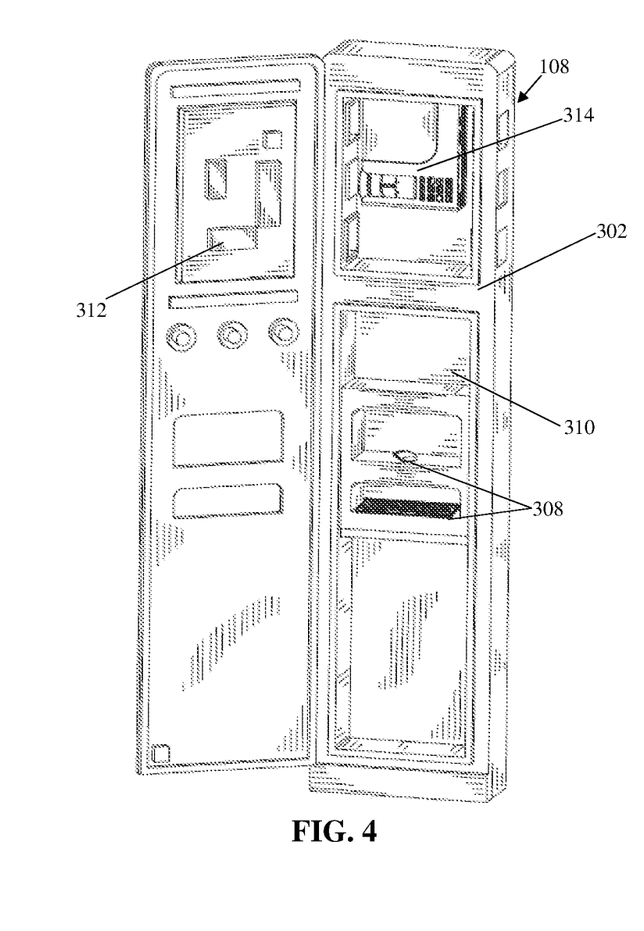
FIG. 4 is a front view of a console of the interactive gaming system of FIG. 1 in an exposed configuration, according to an example embodiment.

Referring now to FIGS. 3 and 4, console 108 is depicted, according to an exemplary embodiment. Console 108 may include a closed configuration (as depicted in FIG. 3) and an exposed configuration (as depicted in FIG. 4) in which the interior wiring and circuitry of console 108 is exposed. In some embodiments, console 108 includes a housing 302, a user interface 304, a projection opening 306, a plurality of input/output devices 308, a computing device 310, and circuitry 312. It is to be understood that projection opening 306 may be allocated among any appropriate surface of housing 302 configured to properly project the visual gameplay and the plurality of black light when applicable. It is to be understood that console 108 may include any applicable electronics, projectors, circuitry, software, firmware, transmitters, or any other applicable components of a gaming console known to those of ordinary skill in the art. In some embodiments, console 108 may include a Bluetooth® module, and computing device 310 may be communicatively coupled to server 102 over network 106. In some embodiments, console 108 further includes an optical projector 314 designed and configured to depict media based on collection and analysis of data by LIDAR system 110. LIDAR system 110 may be embedded in console 108 or optical projector 314.

Figure 5:
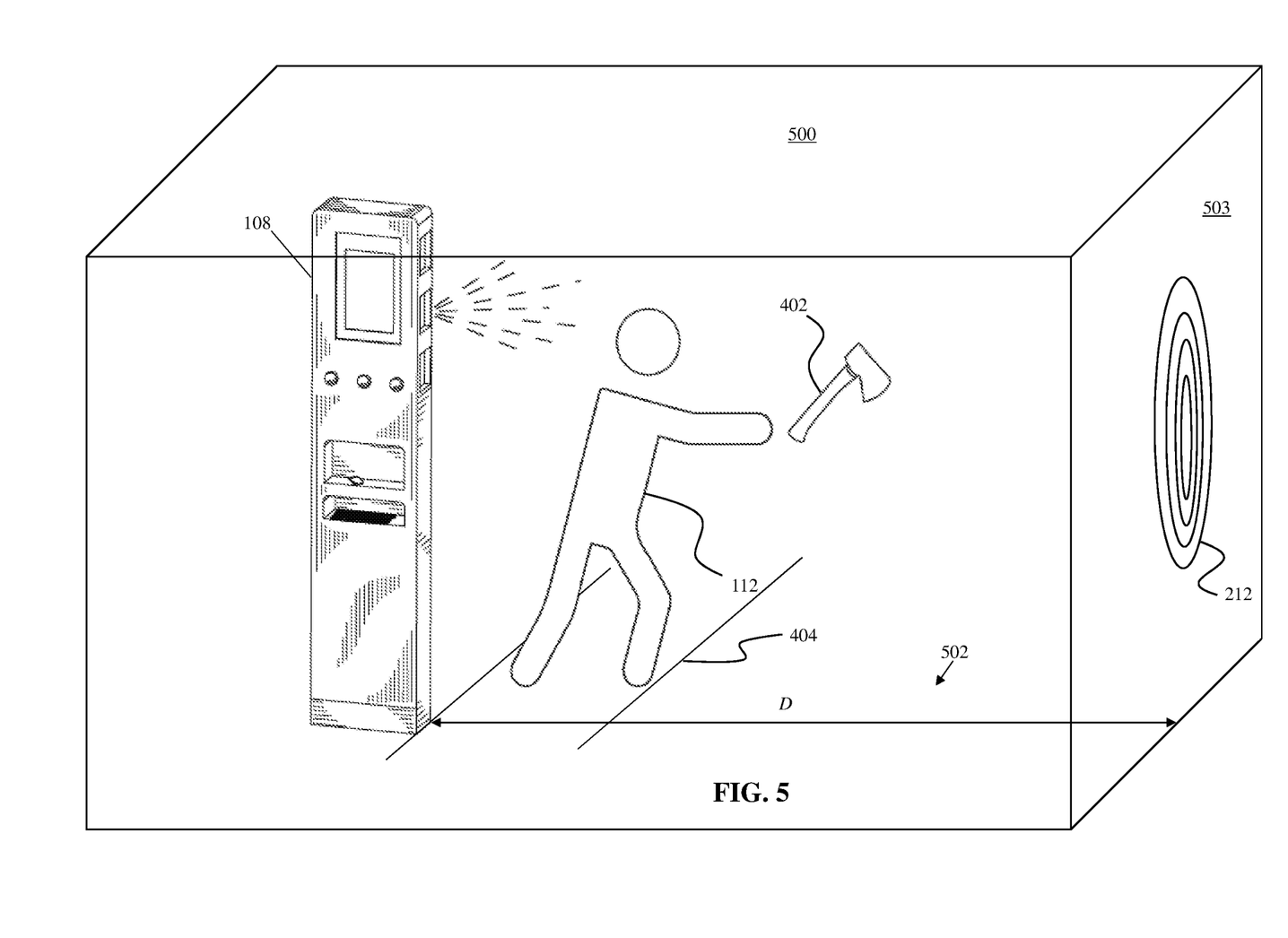
FIG. 5 is a prospective view of an interactive gaming environment of the system of FIG. 1, according to an example embodiment.

Referring now to FIG. 5, an interactive gaming environment is illustrated as a room 500 with a floor 502 and a target wall 503. The room 500 includes a console 108, which is broadcasting an emitted target 212 upon the target wall 503. A user 112 is standing between the console 108 and the target wall 503. In some embodiments, interactive gaming environment includes a physical object 402 configured to interact with emitted target 212, e.g., physically mating with the target 212 so that it sticks to the target 212. It is to be understood that although physical object 402 is depicted as a throwing axe, physical object 402 may be a gameplay gun, an interactive virtual object, darts, squash balls, tennis balls, sports items, or any other applicable mechanism configured to apply interactions to depictions of target 212. It is to be understood that while users are participating in sessions hosted by console 108, LIDAR system 110 is continuously monitoring target wall 503 and the applicable gameplay environments in order to not only efficiently conduct gameplay but also to allow latency reduction module 208 to reduce latency based on analyses performed by sensor module 202 and machine learning module 210. In some embodiments, once physical object 402 interacts with emitted target 212, LIDAR system 110 is able to calculate a score for the throw of user 112 based on calculating the proximity between the location of where physical object 402 has landed and the location of a target point on emitted target 212. It is to be understood that additional factors may be taken into account when calculating the score of a particular throw, including, but not limited to, velocity/force of the throw, location hit within emitted target 212, standing position of user 112 relative to emitted target 212, throwing technique, or any other applicable factor. The target can be moving so that the player needs to time their throw in addition to assuring accuracy. Once scores are calculated, they may be presented on console 108, via computing device 310, or on computing devices 114 and 118.

In some embodiments, console 108 is configured to enter an anti-blinding mode in which LIDAR system 110 and sensor module 202 are continuously monitoring gaming environment 200. Console 108 is projecting the gameplay visuals and LIDAR system 100 is configured to detect one or more modifications to D or any other applicable interference with the projection of the gameplay visuals based on the rate of response. In other words, as laser emitter 204 is continuously generating the plurality of light pulses, sensor module 202 is able to detect modifications and/or interruptions of gameplay visuals due to the distinction between the current reflection rate/amount of time and the reflection rate of gaming environment 200 calculated prior to the detection of the modification/interruption. As a result, console 108 is configured to emit a black light in all or certain areas it is broadcasting to in order to ensure that the gameplay visuals do not strike and impact the eye health of users 112 and 116 if they are located between the emitted target 212 and the console 108. In some embodiments in which sensor module 202 includes a camera, LIDAR system 100 is able to confirm that there is a modification/interruption of gameplay visuals by capturing live image or video of gaming environment 200. In some embodiments, the plurality of black light is configured to be emitted proportionally to the detected dimensions of the source or sub-components of the source of the modification/interruption to gameplay visuals. For example, sensor module 202 may be configured to detect the upper body of user 112 in which the plurality of black light emitted from console 108 is proportioned so that black light is emitted at the waist and up of user 112 while the gameplay visuals are emitted below the waist of user 112. In other embodiments, the system will detect the head of the user 112 and will project black or non-blinding light at the user's head, so as not to blind the user 112. In some embodiments, console 108 may be configured to adjust the projection of gameplay visuals by dimming and/or reducing the output of light being emitted from console 108 in which the output is reduced low enough to prevent blinding of users. It is to be understood that mechanisms such as computer vision may be utilized by server 102, sensor module 202, or any other applicable component of system 100 in order to accurately support detecting, identifying, and classifying modifications/interruptions to gameplay visuals. In some embodiments, console 108 is configured to emit the plurality of black light by generating a silhouette frame including dimensions proportional to the detected source and emitting the plurality of black light into the silhouette frame in order to prevent blinding of players.

Figure 6:
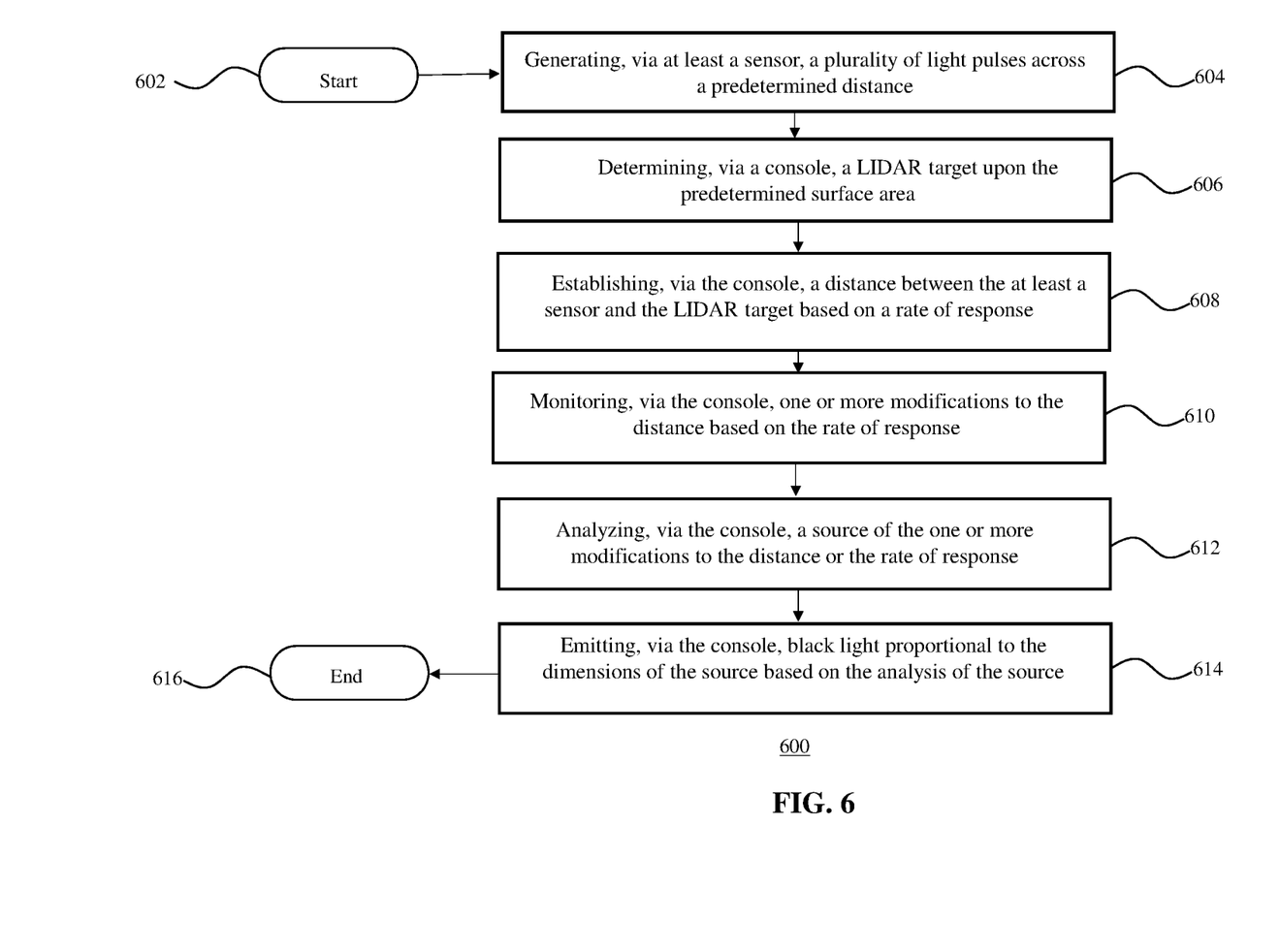
FIG. 6 is a flow diagram illustrating an exemplary method for preventing blinding effect while playing a target game, according to an example embodiment.

Referring now to FIG. 6, a flow diagram illustrating a method of preventing blinding effect 600 is depicted, according to an exemplary embodiment. At step 602, the process begins in which console 108 is positioned and powered within an environment for gameplay. It is to be understood that an environment for gameplay includes an area configured to support some amount of space between console 108 and emitted target 212. At step 604, console 108 and/or LIDAR system 110 generate light pulses across gaming environment 200 allowing LIDAR system 110 to determine where to position emitted target 212. In some embodiments, console 108 is configured to generate a demarcation mark, e.g., line 404 in FIG. 5, that is projected in order to ensure that users 112 and 116 are not entering into the play area unless they are retrieving physical object 402 from a previous throw. Crossing of the demarcation mark may also be used as an indicator for applying a penalty to the score of the player due to physical object 402 being launched at emitted target 212 at an unsafe distance or in a manner not in accordance with the applicable rules. The demarcation mark 404 may be projected before or after target 212 is projected; however, in some instances, the play area must be established in order for the demarcation mark to be emitted. At step 606, console 108 determines the position of emitted target 212 along the projected target wall 503. At step 608, console 108 and/or LIDAR system 110 establishes distance D based on the distance between sensor module 202/console 108 and emitted target 212 supported by the rate of response. In other words, the plurality of pulses (and their reflections) are able to establish the rate of response resulting in distance D being calculated. In some embodiments, distance D may be automatically calculated by console 108 in order to ensure that the play area is in accordance with applicable rules of the applicable game. At step 610, console 108 and/or LIDAR system 110 continuously monitors the play area by continuously generating the plurality of light pulses across the play area, checking for modifications to distance D based upon the reflection created by one or more modifications/interruptions entering gaming environment 200. It is to be understood that crossing of the demarcation mark may automatically trigger console 108 to emit the plurality of black light. At step 612, console 108 and/or LIDAR system 110 analyzes the source of the one or more modifications to D or the rate of response. It is to be understood that LIDAR system 110 is configured to distinguish between a user being the modification and physical object 402 being the modification. In instance where LIDAR system 110 establishes that the source of the modification is physical object 402, then console 108 continues to emit the gameplay visuals. At step 614, upon LIDAR system 110 determining that the modification is not the physical object 402, console 108 initiates anti-blinding mode in which console 108 emits black light into the game area, e.g., the areas between demarcation 404 and target wall 503, shown in FIG. 5. It is to be understood that the proportionality of the emitting of the black light may be based upon an analysis of the source of the modification/interruption of gameplay visuals that indicates which segments and the size of the segments of the gameplay visuals should be filled with black light. At step 616 the process ends.

Figure 7:
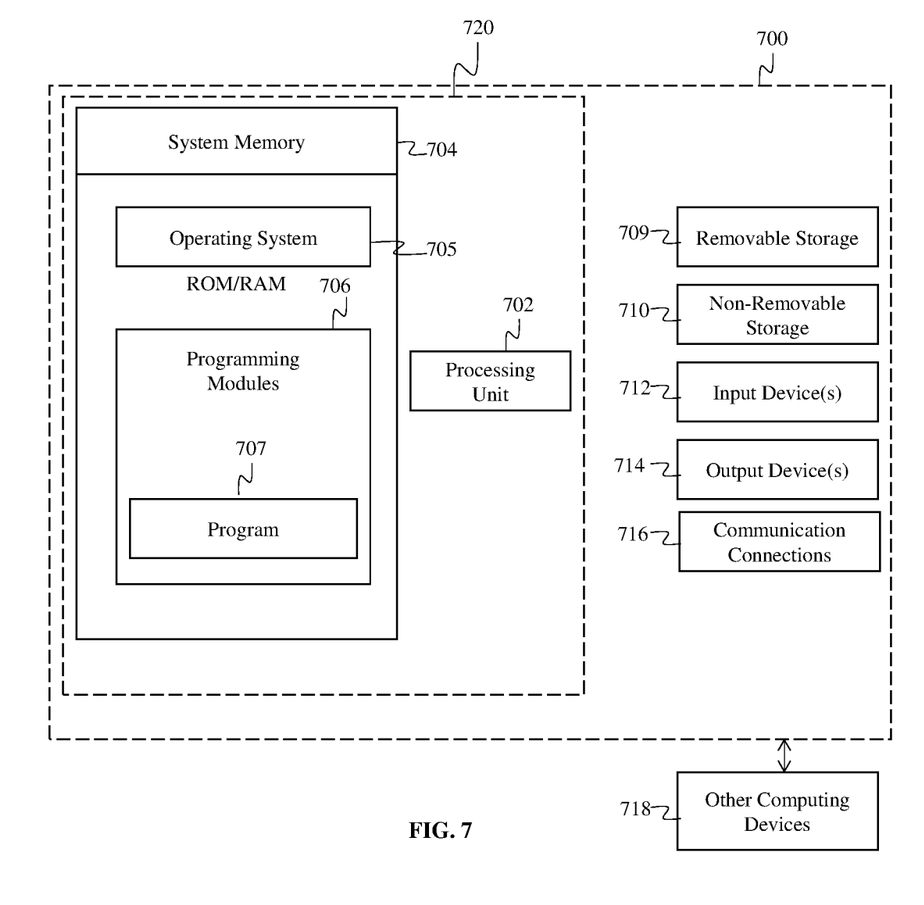
FIG. 7 is a schematic block diagram of a computer system according to exemplary embodiments of the present technology.

FIG. 7 is a block diagram of a system including an example computing device 700 and other computing devices. Consistent with the embodiments described herein, the aforementioned actions performed by server 102, devices 114, 118, and 310 may be implemented in a computing device, such as the computing device 700 of FIG. 7. Any suitable combination of hardware, software, or firmware may be used to implement the computing device 700. The aforementioned system, device, and processors are examples and other systems, devices, and processors may comprise the aforementioned computing device. Furthermore, computing device 700 may comprise an operating environment for system 100 and process/method 600. Process 600, and data related to said processes may operate in other environments and are not limited to computing device 700.

With reference to FIG. 7, a system consistent with an embodiment of the invention may include a plurality of computing devices, such as computing device 700. In a basic configuration, computing device 700 may include at least one processing unit 702 and a system memory 704. Depending on the configuration and type of computing device, system memory 704 may comprise, but is not limited to, volatile (e.g., random access memory (RANI)), non-volatile (e.g., read-only memory (ROM)), flash memory, or any combination or memory. System memory 704 may include operating system 705, and one or more programming modules 706. Operating system 705, for example, may be suitable for controlling computing device 700's operation. In one embodiment, programming modules 706 may include, for example, a program module 707 for executing the actions of server 102, devices 114, 118, and 310, for example. Furthermore, embodiments of the invention may be practiced in conjunction with a graphics library, other operating systems, or any other application program and is not limited to any particular application or system. This basic configuration is illustrated in FIG. 7 by those components within a dashed line 720.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 712 such as a keyboard, a mouse, a pen, a sound input device, a camera, a touch input device, etc. Output device(s) 714 such as a display, speakers, a printer, etc. may also be included. The aforementioned devices are only examples, and other devices may be added or substituted.

Computing device 700 may also contain a communication connection 716 that may allow device 700 to communicate with other computing devices 718, such as over a network in a distributed computing environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 704, including operating system 705. While executing on processing unit 702, programming modules 706 (e.g., program module 707) may perform processes including, for example, one or more of the stages of the process 700 as described above. The aforementioned processes are examples, and processing unit 702 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

The claims appended hereto are meant to cover all modifications and changes within the scope and spirit of the present invention.

What is claimed is:

1. A method for preventing blinding effects, comprising:
generating, via a light source, light across a game-play area and onto a target;
generating, via the light source, in the game-play area, a demarcation line on a floor of the game-play area;
identifying, via a light detection and ranging (LIDAR) device including a laser, the target and a position of demarcation line;
monitoring, via the LIDAR device, at least a portion of the game-play area including the target and the demarcation line;
identifying a person entering the at least a portion of the game-play area being monitored, wherein the identification is made upon the person passing the demarcation line; and
responsive to identifying the person entering the at least a portion of the game-pay area, emitting, via the light source, black light.

2. The method of claim 1, wherein the at least a portion of the game-play area is an area immediately proximate to the target.

3. The method of claim 2, wherein the emitting step comprises:
emitting black light only on the person.

4. The method of claim 1, wherein the emitting step comprises:

generating a silhouette frame with dimensions proportional to the person.

5. The method of claim 1, wherein the target is a physical target configured to receive a physical object projected at the target.

6. The method of claim 5, further comprising:
determining, via the LIDAR device, a distance between the target and a landing location of the physical object; and
generating, via a processor communicatively coupled to the LIDAR device, a score based on the distance.

7. The method claim 6, wherein:
the processor is operable to communicate the score to a computing device communicatively coupled to the processor over a network.

8. The method of claim 1, further comprising:
establishing, via the LIDAR device, a rate of response based on a length of time the LIDAR device requires to detect the target;
reducing, via a latency reduction module, latency associated with generating the light across the game-play area.

9. The method of claim 8, wherein the latency reduction module reduces latency based on the rate of response.

10. A system for interactive gaming comprising:
at least one light generator operable to generate light pulses across a game-play area and onto a target, and to generate a demarcation line on a floor of the game-play area; and
a light detection and ranging (LIDAR) device operable to:
identify the target and a position of the demarcation line;
monitor at least a portion of the game-play area including the demarcation line;
identify a person present in the at least a portion of the game-play area in response to the person passing the demarcation line; and
cause the at least one light source to project black light within the game-play area.

11. The system of claim 10, wherein the game-play area extends from a first end including the at least one light generator to a second end including the target.

12. The system of claim 11, wherein the first and second ends cooperate to define a gaming lane including a distance of at least 13 feet.

13. The system of claim 10, wherein the light generator is operable to emit the black light in a shape that is proportional to at least a part of the person's silhouette.

14. The system of claim 10, wherein the target is a physical target configured to receive a physical object projected at the target.

15. The system of claim 14, wherein the LIDAR device is further operable to determine a distance between the target and a landing location of the physical object and generate a score based on the proximity distance.

16. The system of claim 14, further comprising:
a processor; and
a network connection; wherein the processor is operable to communicate the score to a computing device communicatively coupled to the processor over a network.

17. The system of claim 10, wherein the LIDAR device is configured to include a latency reduction module configured to reduce latency associated with generating the light pulses over the game-play area.

18. The system of claim 17, wherein the latency reduction module reduces latency associated with generating the light pulses across the game-play area based on a rate of response established between the LIDAR device and the game-play area.

* * * * *